(12) United States Patent
Han et al.

(10) Patent No.: US 9,593,429 B2
(45) Date of Patent: Mar. 14, 2017

(54) METHODS OF FABRICATING PHOTONIC CRYSTAL

(71) Applicant: Samsung Electronics Co., Ltd., Suwon-Si, Gyeonggi-Do (KR)

(72) Inventors: Moon Gyu Han, Yongin-si (KR); Chul-Joon Heo, Busan (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 741 days.

(21) Appl. No.: 13/917,841

(22) Filed: Jun. 14, 2013

(65) Prior Publication Data

US 2014/0124369 A1 May 8, 2014

(30) Foreign Application Priority Data

Nov. 8, 2012 (KR) .......................... 10-2012-0126166

(51) Int. Cl.
*C25D 15/00* (2006.01)
*C09D 4/00* (2006.01)
(Continued)

(52) U.S. Cl.
CPC ............... *C25D 15/00* (2013.01); *C09D 4/00* (2013.01); *C25B 7/00* (2013.01); *C25D 13/02* (2013.01);
(Continued)

(58) Field of Classification Search
CPC ........ C25D 15/00; C25D 13/12; C25D 13/02; G02B 1/005; G02B 6/13; G02B 6/1225;
(Continued)

(56) References Cited

U.S. PATENT DOCUMENTS 5,281,370 A * 1/1994 Asher ................... C30B 5/00
264/1.1
5,711,884 A * 1/1998 Asher ................... C30B 5/00
210/639

(Continued)

FOREIGN PATENT DOCUMENTS

KR 20040011621 A 2/2004
KR 20080109229 A 12/2008
(Continued)

OTHER PUBLICATIONS

Arsenault et al, "From colour fingerprinting to the control of photoluminescence in elastic photonic crystals," Nature Materials vol. 5 Mar. 2006 pp. 179-184.*

*Primary Examiner* — Keith Hendricks
*Assistant Examiner* — Colleen M Raphael
(74) *Attorney, Agent, or Firm* — Harness Dickey & Pierce, P.L.C.

(57) ABSTRACT

Provided are a method of fabricating a photonic crystal having a desired photonic bandgap, and a method of fabricating a color filter, including providing a photonic crystal solution in which a plurality of colloidal particles that are electrically charged are dispersed, mixing a photopolymerizable monomer mixture in the photonic crystal solution to form a photopolymerizable monomer-crystal mixture, applying an electric field to the photopolymerizable monomer-crystal mixture to electrically control intervals between the plurality of colloidal particles, and irradiating ultraviolet light to the photopolymerizable monomer-crystal mixture to photopolymerize the monomer mixture to form the photonic crystal or the color filter.

19 Claims, 8 Drawing Sheets

(51) Int. Cl.
  *C25B 7/00* (2006.01)
  *C25D 13/02* (2006.01)
  *C25D 13/12* (2006.01)
  *G02B 6/13* (2006.01)
  *G02B 1/00* (2006.01)
  *G02B 6/122* (2006.01)

(52) U.S. Cl.
  CPC .............. *C25D 13/12* (2013.01); *G02B 1/005* (2013.01); *G02B 6/13* (2013.01); *G02B 6/1225* (2013.01)

(58) Field of Classification Search
  CPC .... C09D 5/00; C09D 4/00; C25B 7/00; G02F 2202/32
  USPC ................ 204/748, 157.15, 478; 438/70–72; 427/457, 472–473, 510
  See application file for complete search history.

(56) References Cited

U.S. PATENT DOCUMENTS

| | | | |
|---|---|---|---|
| 6,261,469 B1* | 7/2001 | Zakhidov | B82Y 20/00 427/128 |
| 6,456,416 B1* | 9/2002 | Ichimura | G02B 6/1225 250/492.22 |
| 2003/0156319 A1* | 8/2003 | John | G02B 6/1225 359/341.5 |
| 2003/0174940 A1* | 9/2003 | Charlton | B82Y 20/00 385/27 |
| 2003/0214690 A1* | 11/2003 | Escuti | G02B 6/1225 359/15 |
| 2004/0101778 A1* | 5/2004 | Barr | C07D 233/64 430/270.1 |
| 2004/0118339 A1* | 6/2004 | Papadimitrakopoulos | C30B 5/00 117/84 |
| 2004/0144650 A1* | 7/2004 | Kumacheva | C30B 19/00 204/471 |
| 2005/0095417 A1* | 5/2005 | Jiang | C30B 5/00 428/304.4 |
| 2007/0119522 A1* | 5/2007 | Grier | G02B 6/1225 148/403 |
| 2008/0093217 A1* | 4/2008 | Wu | G01N 21/658 204/450 |
| 2009/0034051 A1* | 2/2009 | Arsenault | G02B 6/1225 359/290 |
| 2010/0283032 A1* | 11/2010 | Korpi | H01L 29/0665 257/9 |
| 2011/0108779 A1 | 5/2011 | Han et al. | |
| 2013/0004754 A1* | 1/2013 | Hara | C09D 133/08 428/213 |
| 2013/0146788 A1* | 6/2013 | Yin | G02B 5/201 250/492.1 |

FOREIGN PATENT DOCUMENTS

| | | |
|---|---|---|
| KR | 20090086192 A | 8/2009 |
| KR | 10-0922892 B1 | 10/2009 |
| KR | 20090115786 A | 11/2009 |
| KR | 20090118768 A | 11/2009 |
| KR | 20110050930 A | 5/2011 |

* cited by examiner

METHODS OF FABRICATING PHOTONIC CRYSTAL

CROSS-REFERENCE TO RELATED APPLICATIONS

This application claims the benefit of priority under 35 U.S.C. §119 from Korean Patent Application No. 10-2012-0126166, filed on Nov. 8, 2012, in the Korean Intellectual Property Office, the disclosure of which is incorporated herein by reference in its entirety.

BACKGROUND

1. Field

Example embodiments relate to methods of fabricating a photonic crystal, and more particularly, to methods of easily fabricating a photonic crystal having a desired photonic bandgap using an electrophoretic method.

2. Description of the Related Art

A photonic crystal is an artificial crystal that may be obtained by periodically arranging two or more substances having different refractive indexes in a two-dimensional or a three-dimensional lattice structure. A photonic crystal having a regular lattice structure may have a photonic bandgap that may disallow (prevent), or allow, light having a specific wavelength to pass through due to a periodic refractive index distribution. For example, in the case where an optical bandgap of a photonic crystal is formed in a band of visible spectrum and a frequency of light incident into the photonic crystal corresponds to the optical bandgap, incident light of not less than 99% can be reflected by the photonic crystal. On the contrary, most of incident light having a frequency other than the photonic bandgap goes through the photonic crystal. By using such a characteristic, a photonic crystal may be applied to a color filter of a display device. Also, to increase the light absorbance of a solar cell or increase the sensitivity of a light sensor using a phenomenon that light absorption increases drastically when the photonic band edge of a photonic bandgap coincides with a light-absorbing region of a light-absorbing substance, a photonic crystal may be applied.

The photonic bandgap of such a photonic crystal may vary according to refractive indices and periodic lattice structures of dielectric materials constituting the photonic crystal. Therefore, proper selection of types and lattice structures of dielectric materials enables to produce a photonic crystal having a desired photonic bandgap. Methods of producing a three-dimensional photonic crystal may include a top-down method using lithography, and a self-assembly method using a physical or chemical combination of colloidal particles and polymer. While the self-assembly method allows a three-dimensional photonic crystal to be produced at a relatively inexpensive cost, it requires a long process time and also has difficulties in realizing a desired photonic bandgap exactly. Thus, because many process steps are required to adjust the photonic bandgap exactly, process complexity is increased and production of a large-area photonic crystal is limited.

SUMMARY

Provided are methods of fabricating a photonic crystal having a desired photonic bandgap using an electrophoretic method.

Also, provided are methods of fabricating a color filter using the methods of fabricating a photonic crystal.

According to example embodiments, a method of fabricating a photonic crystal, includes providing a photonic crystal solution in which a plurality of colloidal particles are dispersed, the plurality of colloidal particles being electrically charged, mixing a photopolymerizable monomer mixture in the photonic crystal solution to form a photopolymerizable monomer-crystal mixture, applying an electric field to the photopolymerizable monomer-crystal mixture to electrically control intervals between the plurality of colloidal particles, and irradiating ultraviolet light to the photopolymerizable monomer-crystal mixture to photopolymerize the photopolymerizable monomer mixture so as to form the photonic crystal.

The plurality of colloidal particles may be formed from a polar material exhibiting polarity at a surface thereof independent of an external stimulus.

The plurality of colloidal particles may include one selected from polystyrene, silica, PMMA, PBMA, and a copolymer thereof.

The plurality of colloidal particles may each have a diameter substantially equal to a diameter of the other colloidal particles.

The photopolymerizable monomer mixture may include a mixture of photopolymerizable monomers, a photo-initiator, and a crosslinker.

The photopolymerizable monomers may include one selected from poly-(ethylene glycol) methacrylate, poly-(ethylene glycol) diacrylate, poly(ethylene glycol) methyl ether acrylate, ethylene glycol methacrylate, ethylene glycol methyl ether acrylate, and acrylamide, the crosslinker may include one selected from poly-(ethylene glycol) dimethacrylate, N,N'-Methylenebisacrylamide, ethylene glycol dimethacrylate, and divinylbenzene, and the photo-initiator may include one selected from diethoxy acetophenone and 2,2-dimethoxy-2-phenylacetophenone.

The electric field may have an uniform intensity.

In the electrically controlling of intervals between the plurality of colloidal particles, the interval in a vertical direction between the plurality of colloidal particles may gradually varying according to a height of the photonic crystal solution by gradually varying an intensity of the electric field according to the height of the photonic crystal solution.

The method may further include infiltrating an etchant into the photonic crystal to remove the plurality of colloidal particles, after irradiating the ultraviolet light.

The method may further injecting additional particles into the photonic crystal to adjust the photonic bandgap of the photonic crystal, after irradiating the ultraviolet light.

The additional particles may include quantum dots absorbing light of a specific wavelength band to generate light of a different wavelength band.

The method may further include compressing or swelling the photonic crystal to adjust a photonic bandgap of the photonic crystal, after irradiating the ultraviolet light.

The plurality of colloidal particles may be spaced apart from each other by a first distance prior to applying the electric field to the photopolymerizable monomer-crystal mixture; and the plurality of colloidal particles may be spaced apart from each other by a second distance after applying the electric field to the photopolymerizable monomer-crystal mixture, the second distance being less than the first distance.

According to other example embodiments, a method of fabricating a color filter includes providing at least two sheets of substrates facing each other and at least two photopolymerizable monomer-crystal mixtures filling an area between the at least two sheets of substrates, wherein the at least two photopolymerizable monomer-crystal mixtures each include a photonic crystal solution, a photopolymerizable monomer mixture and a plurality of colloidal particles dispersed in the photopolymerizable monomer-crystal mixture, the plurality of colloidal particles being electrically charged, controlling intervals between the plurality of colloidal particles to different intervals by applying a different voltage to each of the at least two photopolymerizable monomer-crystal mixtures, and irradiating ultraviolet light to the at least two photopolymerizable monomer-crystal mixtures to photopolymerize the photopolymerizable monomer mixture so as to form the color filter.

The plurality of colloidal particles may be formed from a polar material exhibiting polarity at a surface thereof independent of an external stimulus.

The plurality of colloidal particles may include one selected from polystyrene, silica, PMMA, PBMA, and a copolymer thereof.

The photonic crystal solution in each of the at least two photopolymerizable monomer-crystal mixtures may have the same composition.

The photonic crystal solution may be configured to reflect light of a red wavelength band when a voltage is not applied.

The photopolymerizable monomer mixture may include a mixture of photopolymerizable monomers, a photo-initiator, and a crosslinker.

The photopolymerizable monomers may include one selected from poly-(ethylene glycol) methacrylate, poly-(ethylene glycol) diacrylate, poly(ethylene glycol) methyl ether acrylate, ethylene glycol methacrylate, ethylene glycol methyl ether acrylate, and acrylamide, the crosslinker may include one selected from poly-(ethylene glycol) dimethacrylate, N,N'-Methylenebisacrylamide, ethylene glycol dimethacrylate, and divinylbenzene, and the photo-initiator may include one selected from diethoxy acetophenone and 2,2-dimethoxy-2-phenylacetophenone.

At least one of the at least two sheets of substrates may be a transparent substrate.

BRIEF DESCRIPTION OF THE DRAWINGS

Example embodiments will be more clearly understood from the following detailed description taken in conjunction with the accompanying drawings. FIGS. 1-8B represent non-limiting, example embodiments as described herein.

DETAILED DESCRIPTION

Various example embodiments will now be described more fully with reference to the accompanying drawings in which some example embodiments are shown. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments relate to methods of fabricating a photonic crystal, and more particularly, to methods of easily fabricating a photonic crystal having a desired photonic bandgap using an electrophoretic method.

Figure 1A:
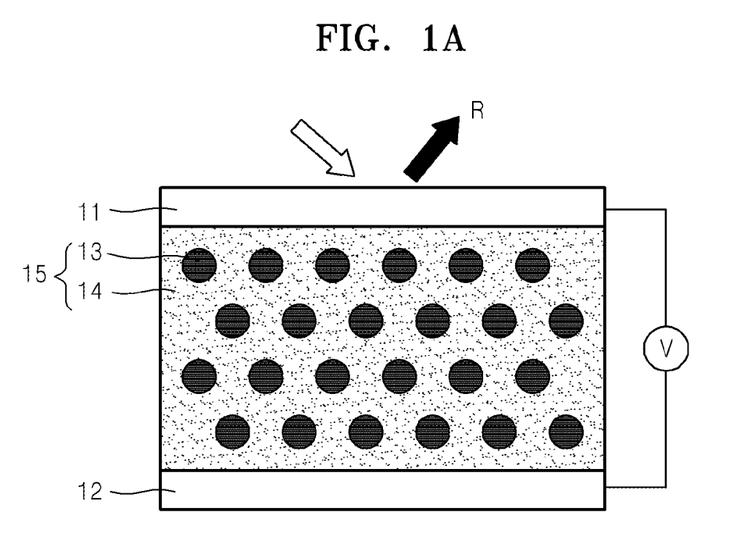
FIGS. 1A and 1B schematically illustrate a method of fabricating a photonic crystal, according to example embodiments, wherein intervals between colloidal particles vary according to a variation in voltage applied to a photonic crystal layer composed of the colloidal particles dispersed in a solvent.
Figure 1B:
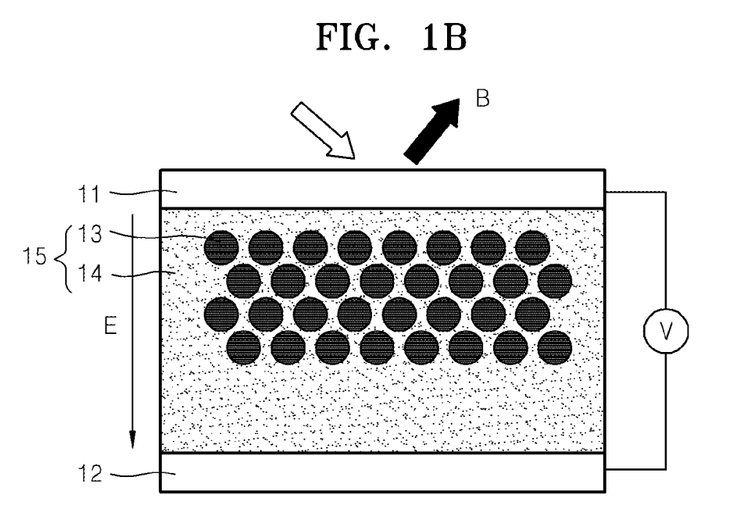

FIGS. 1A and 1B schematically illustrate a method of fabricating a photonic crystal, according to example embodiments, wherein intervals between colloidal particles vary according to a variation in voltage applied to a photonic crystal layer composed of the colloidal particles dispersed in a solvent.

Referring to FIG. 1A, electrodes 11 and 12 are respectively disposed on and under a photonic crystal solution 15 including a solvent 14 and colloidal particles 13 electrically charged and dispersed in the solvent 14. The solvent 14 may be an inorganic solvent such as water. The colloidal particles 13 may be prepared by applying an electrical stimulus to metal particles, or from a polar material exhibiting polarity at a surface thereof by itself (or, alternatively, independent of, for example, an electrical stimulus). For example, a zeta potential of about −70 mV may be naturally generated in (or, alternatively, at) the surface of a polystyrene nanoparticle having a diameter of about 135 nm. The colloidal particles 13 having surfaces that are electrically charged are aligned by themselves due to a repulsive force therebetween in the solvent 14. As a result, the charged colloidal particles 13 in the solvent 14 may be arranged in a periodic structure having constant intervals, as illustrated in FIG. 1A. The colloidal particles 13 dispersed in the solvent 14 have characteristics of a photonic crystal due to the periodic arrangement thereof.

The photonic bandgap of the photonic crystal solution 15 may be determined by the size and density of the colloidal particles 13. For example, FIG. 2 is a graph illustrating variation in stop-band of the photonic crystal solution according to the volume fraction of the colloidal particles dispersed in the solvent.

Figure 2:
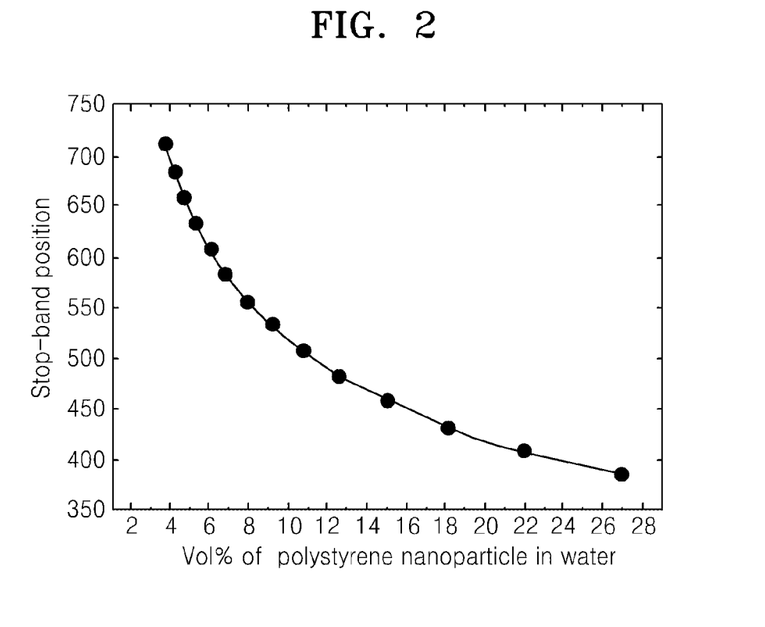
FIG. 2 is a graph illustrating variation in stop-band of the photonic crystal according to the volume % of colloidal particles dispersed in a solvent.

Referring to the graph of FIG. 2, it may be seen that, as the volume fraction (vol. %) of the colloidal particles 13 in the solvent 14 increases, the stop-band of the photonic crystal solution 15 is shifted to a short wavelength band. In FIG. 1A, it is exemplarily illustrated that the photonic crystal solution 15 reflects light of a red wavelength band.

As illustrated in FIG. 1B, when a voltage is applied between the two electrodes 11 and 12, the negatively charged colloidal particles 13 move towards a positive electrode. FIG. 1B illustrates that a positive (+) voltage is applied to the upper electrode 11 and a negative (−) voltage is applied to the lower electrode 12. However, the present disclosure is not limited thereto, and it is also possible that the colloidal particles 13 that are positively charged are dispersed in the solvent and a negative (−) voltage is applied to the upper electrode 11. When the colloidal particles 13 gather at the upper electrode 11, the intervals between the colloidal particles 13 are narrowed, so that the photonic bandgap of the photonic crystal solution 15 varies.

Figure 3:
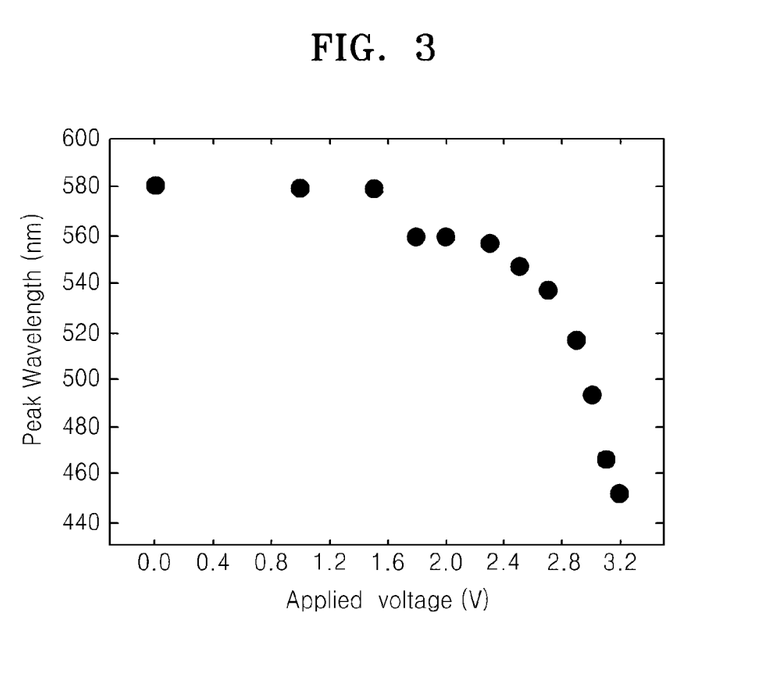
FIG. 3 is a graph illustrating the variation in peak wavelength of light reflected by a photonic crystal layer according to a voltage applied to the photonic crystal layer illustrated in FIG. 1B.

The variation in photonic bandgap may be controlled according to the applied voltage. For example, FIG. 3 is a graph illustrating the variation in peak wavelength of light reflected by the photonic crystal solution according to a voltage applied to the photonic crystal solution illustrated in FIG. 1B. The graph of FIG. 3 illustrates measurement results of light reflected by a photonic crystal solution in which polystyrene nanoparticles having a diameter of about 135 nm are dispersed in water in a volume fraction of about 22 vol. % while a voltage is applied to the photonic crystal solution.

Referring to the graph of FIG. 3, it may be seen that as the applied voltage increases up to 3.2 V, the interval between the colloidal particles is reduced so that the peak wavelength of the reflected light varies to a short wavelength of about 450 nm from about 580 nm. In FIG. 1B, it is exemplarily illustrated that the photonic crystal solution 15 reflects light of a blue wavelength band when the applied voltage is 3 V.

By using this principle, a photonic crystal having a desired photonic bandgap may be easily fabricated. For example, a photonic crystal having a desired photonic bandgap may be easily fabricated by properly selecting the size and volume fraction of the colloidal particles 13 to prepare the photonic crystal solution 15, controlling an applied voltage, and solidifying the photonic crystal solution 15 to fix the colloidal particles 13.

FIGS. 4A through 4G schematically illustrate a method of fabricating a photonic crystal having a desired photonic bandgap using an electrophoretic method using the aforementioned principle.

Figure 4A:
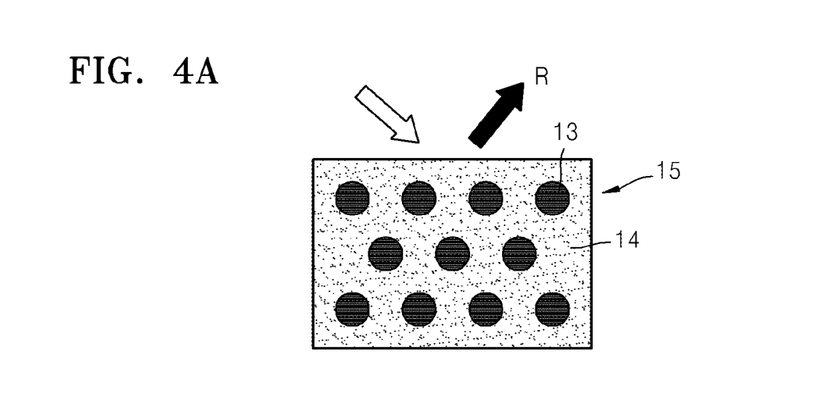
FIGS. 4A through 4G schematically illustrate a method of fabricating a photonic crystal having a desired photonic bandgap using an electrophoretic method.

Referring to FIG. 4A, a photonic crystal solution 15 in which colloidal particles 13 that are electrically charged are dispersed in a solvent 14 is prepared. By properly selecting the diameter and density of the colloidal particles 13, it is possible to set an initial photonic bandgap to a desired value. For example, the initial photonic bandgap may be set such that the photonic crystal solution 15 reflects light of a red wavelength band and transmits or absorbs light of other wavelength bands. In one example, polystyrene nanoparticles having a diameter of about 135 nm may be used as the colloidal particles 13, water may be used as the solvent 14, and the volume fraction of the colloidal particles 13 to the solvent 14 may be about 22 vol. %. However, this is only one example, and example embodiments are not limited thereto.

In the case where the initial photonic bandgap is set to a different value, the types of the colloidal particles 13 and the solvent 14 and the size and volume fraction of the colloidal particles 13 may vary. For example, the diameter of the colloidal particles 13 may be selected between about 10 nm and about 500 nm, and the volume fraction of the colloidal particles 13 may be selected between about 5 vol. % and 50 vol. %. All the colloidal particles 13 dispersed in the solvent 14 may have the same (or, alternatively, equal) diameter. Also, the colloidal particle 13 may be formed from silica, polymethylmethacrylate (PMMA), poly-n-butylmethacrylate (PBMA) or a copolymer thereof as well as polystyrene.

Figure 4B:
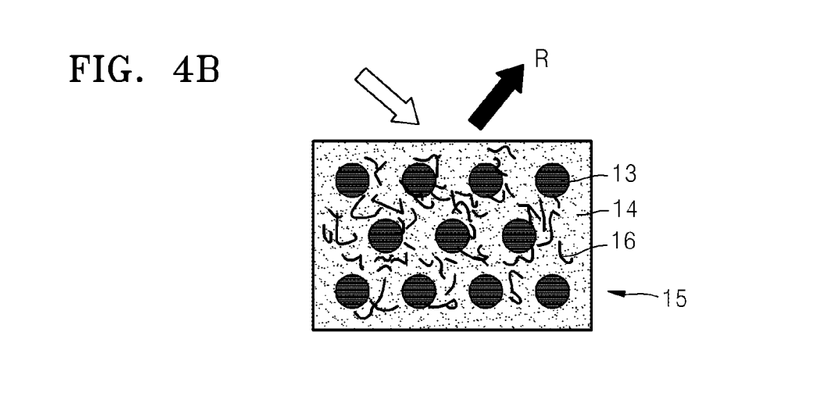

Referring to FIG. 4B, a photopolymerizable monomer mixture 16 is mixed in the photonic crystal solution 15. The photopolymerizable monomer mixture 16 may be a mixture of monomers for photopolymerization, a photo initiator, and a crosslinker. Examples of the monomers for photopolymerization may include oligomer of poly-(ethylene glycol) methacrylate, poly-(ethylene glycol) diacrylate or poly(ethylene glycol) methyl ether acrylate, ethylene glycol methacrylate, ethylene glycol methyl ether acrylate, acrylamide, or the like. Examples of the crosslinker may include poly-(ethylene glycol) dimethacrylate, N,N'-Methylenebisacrylamide, ethylene glycol dimethacrylate, or divinylbenzene, and examples of the photo-initiator may include diethoxy acetophenone or 2,2-dimethoxy-2-phenylacetophenone. The amount of the photopolymerizable monomer mixture 16 may be properly selected according to the amount of the solvent 14. For example, when the volume of the solvent 14 is in a range of about 0.5-2 ml, the volume of the monomers for photopolymerization may be about 400 μl, the volume of the crosslinker may be about 100 μl, and the volume of the photo-initiator may be about 10 μl.

Figure 4C:
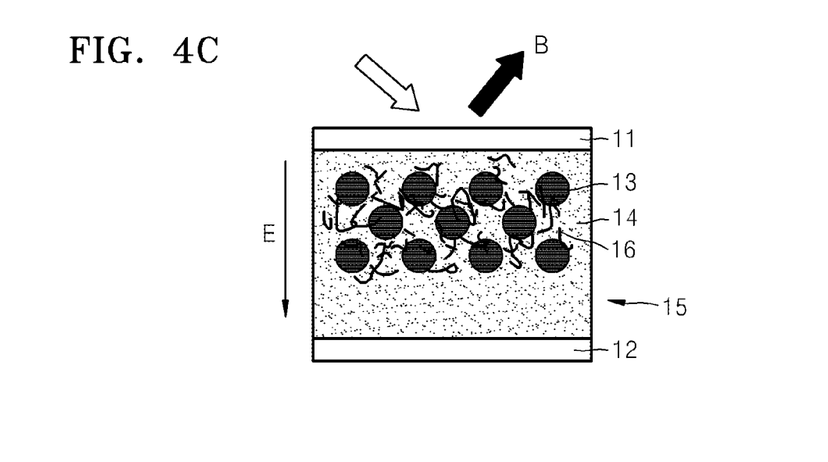

Referring to FIG. 4C, the photonic crystal solution 15 mixed with the above-mentioned monomer mixture 16 is filled between two electrodes 11 and 12 and a voltage is applied therebetween. Then, the colloidal particles 13 gather toward any one of the two electrodes 11 and 12 according to the polarity of charged surfaces of the two electrodes 11 and 12. For example, the colloidal particles 13 charged negatively may be gathered toward the positive electrode, i.e., the upper electrode 11. As a result, the interval between the colloidal particles 13 is narrowed and thus the photonic bandgap varies. The voltage applied between the two electrodes 11 and 12 may vary according to a desired final photonic bandgap. For example, referring to the graph of FIG. 3, in the case of adjusting the photonic bandgap such that light of a blue wavelength band is reflected, a voltage of about 3 volts may be applied between the two electrodes 11 and 12.

Figure 4D:
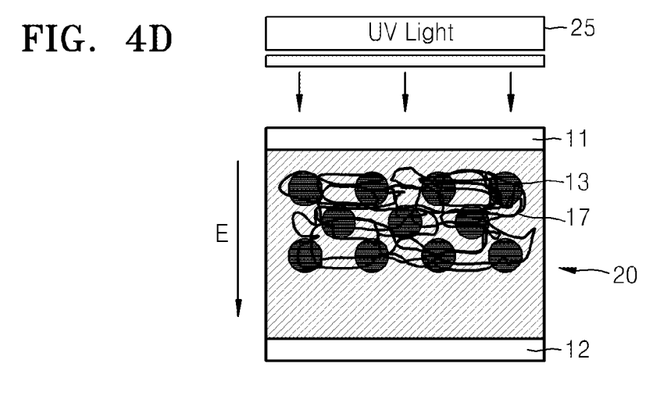

After the photonic bandgap is adjusted to the desired value, ultraviolet light is irradiated to the photonic crystal solution 15 mixed with the photopolymerizable monomer mixture 16 by using a UV light source 25 as illustrated in FIG. 4D while continuing to apply the voltage between the two electrodes 11 and 12. Then, the photopolymerizable monomer mixture 16 in the photonic crystal solution 15 is photopolymerized by ultraviolet light and becomes a polymer 17. At this time, a photonic crystal 20 in which the colloidal particles 13 are periodically fixed in the polymer 17 may be formed. The formed photonic crystal 20 thus may have the desired photonic bandgap.

Figure 5:
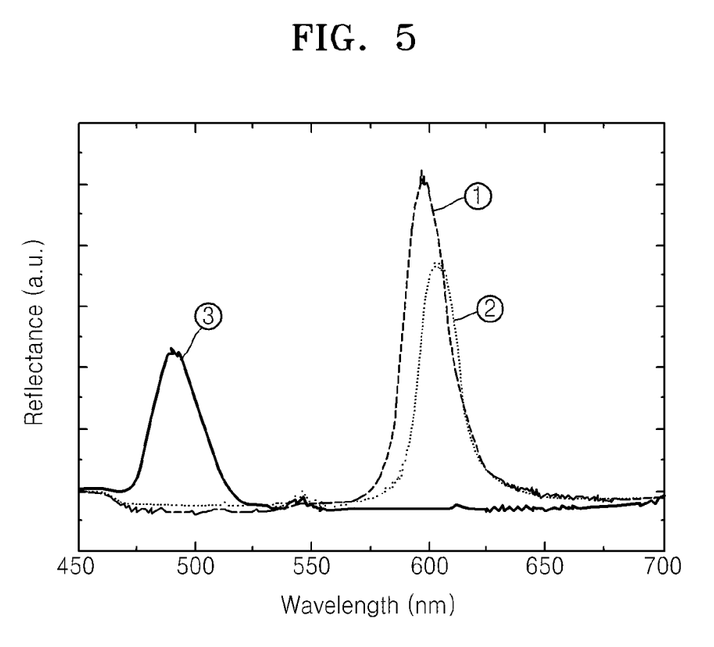
FIG. 5 is a graph illustrating the variation in reflectance characteristic before monomers dispersed in a photonic crystal solution are polymerized and after a monomer mixture is polymerized to form a photonic crystal.

For example, FIG. 5 illustrates the variation in reflectance characteristic before the monomer mixture dispersed in the photonic crystal solution is polymerized and after the monomer mixture is polymerized to form the photonic crystal.

Referring to FIG. 5, graph ① indicates the reflectance characteristic when a voltage is not applied to the photonic crystal solution 15, graph ② indicates the reflectance characteristic after UV light is irradiated to the photonic crystal solution 15 to photopolymerize the photonic crystal solution 15 without applying a voltage to the photonic crystal solution 15, and graph ③ indicates the reflectance characteristic after a voltage of about 3 volts is applied to the photonic crystal solution 15 and UV light is irradiated to the photonic crystal solution 15 to photopolymerize the photonic crystal solution 15. Comparing graph ① with graph ②, it may be seen that after the photonic crystal solution 15 is photopolymerized, the reflectance is slightly lowered, but a peak wavelength band of reflected light of a red wavelength band is not almost changed. Also, as illustrated in graph ①, when the photonic crystal solution 15 is photopolymerized and when a voltage of about 3 volts is applied, it may be seen that the peak wavelength of the reflected light is shifted from the red wavelength band to the blue wavelength band.

According to the above-mentioned method of fabricating the photonic crystal 20, because the size of the plurality of colloidal particles 13 is not controlled but the interval between the plurality of colloidal particles 13 having the same size is electrically controlled, the photonic crystal 20 having the desired photonic bandgap may be fabricated easily and inexpensively. Also, because the process for forming the photonic crystal 20 is simple, it is also possible to fabricate a large area photonic crystal 20.

Figure 4E:
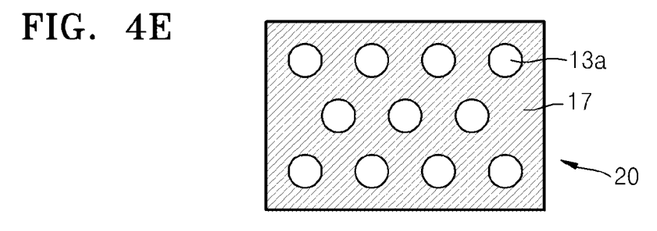

The photonic bandgap of the photonic crystal 20 fabricated by the above-mentioned method may be further finely adjusted through a subsequent additional process. For example, as illustrated in FIG. 4E, by allowing an etchant for etching the colloidal particles 13 to infiltrate into the photonic crystal 20, some or all of the colloidal particles 13 in the photonic crystal 20 may be removed. Then, vacant spaces 13a are formed at locations where the colloidal particles 13 existed in the photonic crystal 20, and thus, the photonic bandgap of the photonic crystal 20 may be changed.

Figure 4F:
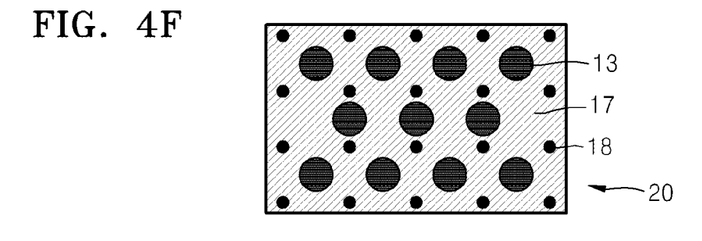

Referring to FIG. 4F, the photonic bandgap may be changed by injecting additional nanoparticles 18 into the photonic crystal 20. Examples of methods of injecting the nanoparticles 18 into the photonic crystal 20 may include a method of infiltrating nanoparticles and a method of growing the nanoparticles 18 in the photonic crystal 20 by immersing the photonic crystal 20 in a nanoparticle generation solution. These nanoparticles 18 may be functional molecules having a specific function. For example, the nanoparticles 18 may be quantum dots that absorb light of a specific wavelength band to generate light of a different wavelength band.

Figure 4G:
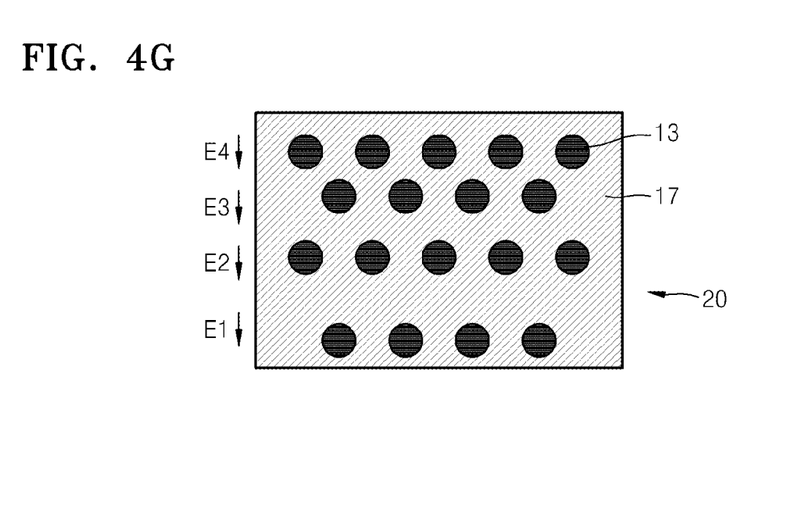

While FIGS. 4C and 4D illustrate that an electric field having a uniform intensity is applied to the photonic crystal solution 15, example embodiments are not limited thereto. For example, as illustrated in FIG. 4G, the photonic crystal solution 15 may be photopolymerized while the intensity of the electric field is changed according to the height of the photonic crystal solution 15. By doing so, it is possible to fabricate the photonic crystal 20 in which the interval between the colloidal particles 13 is gradually changed according to the height of the photonic crystal solution 15.

Figure 6A:
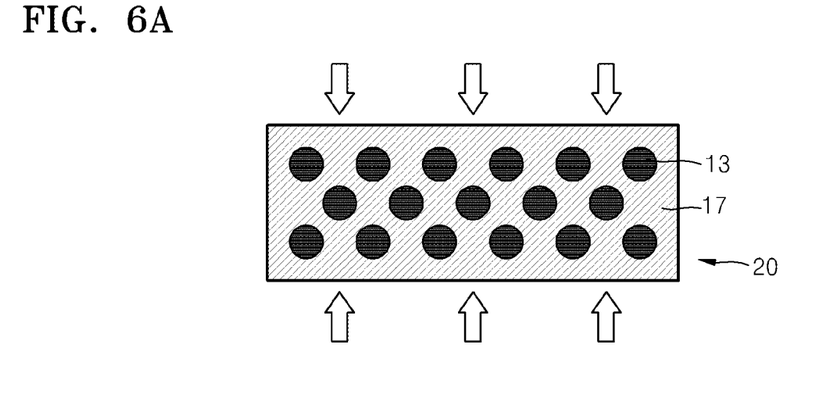
FIGS. 6A and 6B schematically illustrate a method of controlling the photonic bandgap by forming a photonic crystal having elasticity and then mechanically compressing/swelling the formed photonic crystal.
Figure 6B:
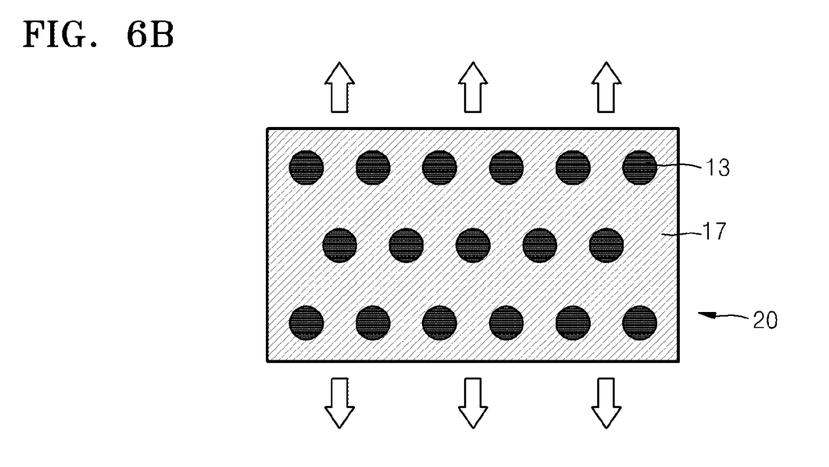

FIGS. 6A and 6B schematically illustrate a method of controlling the photonic bandgap by forming a photonic crystal having elasticity and then mechanically compressing/swelling the formed photonic crystal.

Figure 7:
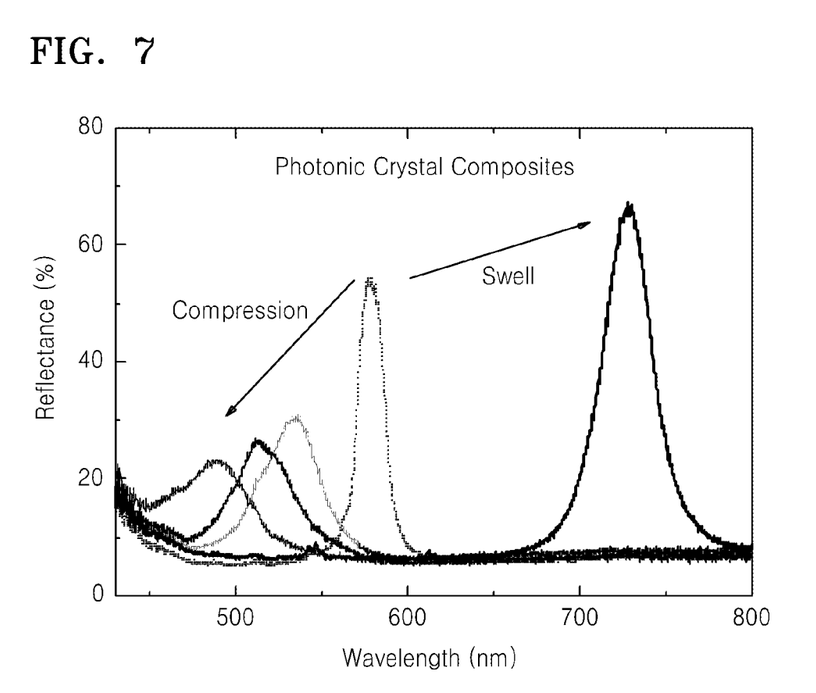
FIG. 7 is a graph illustrating the variation in reflectance characteristic according to contraction/swelling of a photonic crystal having elasticity.

The photonic crystal 20 may be fabricated to be elastically deformable according to the type of the photopolymerizable monomer mixture 16. For example, by using the above-mentioned poly-(ethylene glycol) methacrylate as the monomer for photopolymerization, the photonic crystal 20 may have characteristics of elastomer. Then, the photonic crystal 20 may be mechanically compressed, as illustrated in FIG. 6A, or may be mechanically swelled, as illustrated in FIG. 6B. When the photonic crystal 20 is compressed or swelled, the interval between the colloidal particles 13 in the photonic crystal 20 is decreased or increased, and thus the photonic bandgap of the photonic crystal 20 may be changed. For example, FIG. 7 is a graph illustrating the variation in reflectance characteristic according to compression/swelling of a photonic crystal having elasticity. As illustrated in the graph of FIG. 7, when the photonic crystal 20 is compressed, the peak wavelength of the reflected light may be decreased, and when the photonic crystal 20 is swelled, the peak wavelength may be increased. Also, the photonic crystal 20 may be swelled by mechanically pulling the photonic crystal 20 or adding the photonic crystal 20 in a solvent such as water.

According to the fabricating principle of the above-mentioned photonic crystal 20, a color filter may be easily fabricated.

Figure 8A:
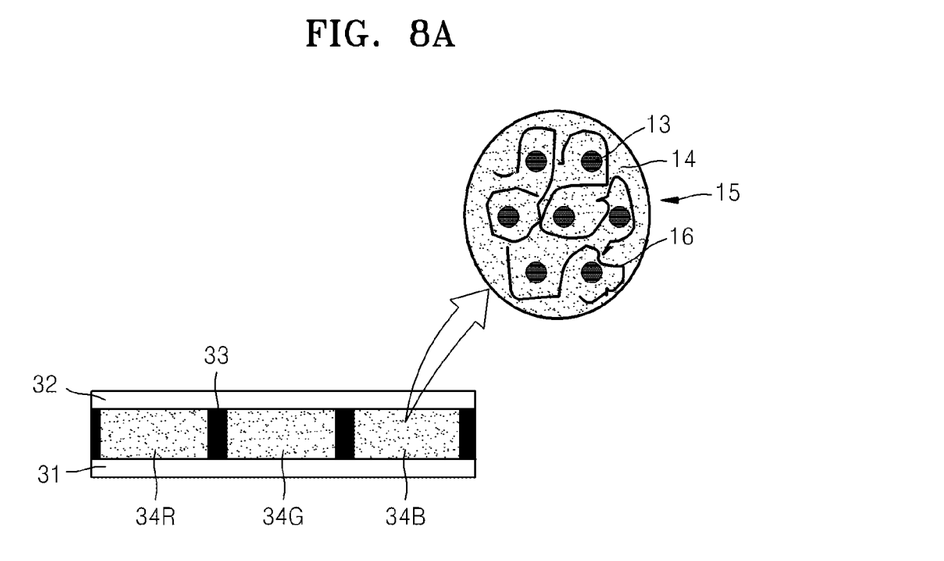
FIGS. 8A and 8B schematically illustrate a method of fabricating an RGB color filter using the principle illustrated in FIG. 1.
Figure 8B:
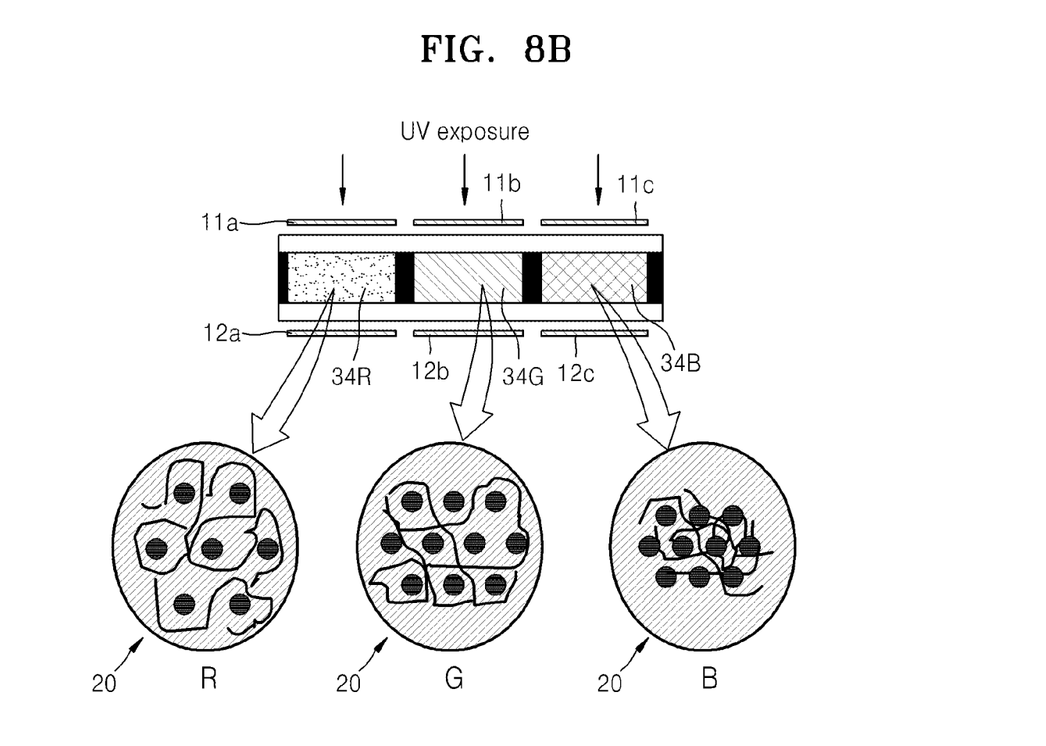

FIGS. 8A and 8B schematically illustrate a method of fabricating an RGB color filter using the above-described principle.

Referring to FIG. 8A, the above-mentioned photonic crystal solution 15 is filled in a plurality of spaces 34R, 34G, 34B partitioned by barrier ribs 33, two sheets of substrates 31 and 32 are disposed facing each other, and the photonic crystal solution 15 is injected between the two sheets of substrates 31 and 32. At least one of the two sheets of substrates 31 and 32 may be a transparent substrate. Herein, a photopolymerizable monomer mixture 16 is mixed in the photonic crystal solution 15. For the convenience of description, only three spaces 34R, 34G, and 34B are illustrated in FIG. 8A. However, example embodiments are not limited thereto. The three spaces 34R, 34G, and 34B respectively become a red filter region, a green filter region, and a blue filter region, later, but the photonic crystal solution 15 and the photopolymerizable monomer mixture 16 are equally filled in all the three spaces 34R, 34G, and 34B. For example, the photonic crystal solution 15 may be configured to reflect light of a red wavelength band when a voltage is not applied.

Thereafter, as illustrated in FIG. 8B, electrodes 11a, 12a; 11b, 12b; and 11c, 12c are independently disposed over the three spaces 34R, 34G, and 34B, respectively, and different voltages may be applied to the electrodes 11a, 12a; 11b, 12b; and 11c, 12c. For example, a voltage may not be applied to the space 34R which will become the red filter region, a voltage of about 2.5 volts may be applied to the space 34G which will become the green filter region, and a voltage of about 3 volts may be applied to the space 34B which will be the blue filter region. Then, the interval between the colloidal particles 13 in the photonic crystal solution 15 is changed in each of the spaces 34R, 34G, and 34B. The interval between the colloidal particles 13 may be shorter in the space 34G which will be the green filter region than that in the space 34R which will be the red filter region, and the interval between the colloidal particles 13 may be shorter in the space 34B which will be the blue filter region than that in the space 34G which will be the green filter region Thereafter, by irradiating UV light into the all the spaces 34R, 34G, and 34B at the same time, the photonic crystals 20 having photonic bandgaps different from one another may be formed in the spaces 34R, 34G, and 34B, respectively. For example, the photonic crystal 20 formed in the space 34R of the red filter region has a characteristic of reflecting light of a red wavelength band, the photonic crystal 20 formed in the space 34G of the green filter region has a characteristic of reflecting light of a green wavelength band, and the photonic crystal 20 formed in the space 34B of the blue filter region has a characteristic of reflecting light of a blue wavelength band.

According to the above-described method of fabricating method a color filter, there is no need to perform many processes in order to exhibit an inherent color characteristic in each of the RGB pixels, and the color filter may be easily fabricated through a simple process of applying a voltage necessary for each pixel and exposing each pixel to UV light.

As above, for illustrative purposes, example embodiments of a method of fabricating a photonic crystal have been described with reference to the accompanying drawings. However, it should be understood that the example embodiments described therein should be considered in a descriptive sense only and not for purposes of limitation. Descriptions of features within each example embodiment should typically be considered as available for other similar features in other example embodiments.

What is claimed is:

1. A method of fabricating a photonic crystal, comprising:
   providing a photonic crystal solution in which a plurality of colloidal particles are dispersed, the plurality of colloidal particles being electrically charged;
   mixing a photopolymerizable monomer mixture in the photonic crystal solution to form a photopolymerizable monomer-crystal mixture;
   gradually varying an intensity of an electric field applied in a vertical direction between a top surface and a bottom surface of the photopolymerizable monomer-crystal mixture to electrically control intervals between the plurality of colloidal particles such that the intervals in the vertical direction between the plurality of colloidal particles gradually vary according to a height of the photonic crystal solution; and
   irradiating ultraviolet light to the photopolymerizable monomer-crystal mixture to photopolymerize the photopolymerizable monomer mixture so as to form the photonic crystal.

2. The method of claim 1, wherein the plurality of colloidal particles are formed from a polar material exhibiting polarity at a surface thereof independent of an external stimulus.

3. The method of claim 2, wherein the plurality of colloidal particles include one selected from polystyrene, silica, PMMA, PBMA, and a copolymer thereof.

4. The method of claim 1, wherein diameters of the plurality of colloidal particles are substantially equal to each other.

5. The method of claim 1, wherein the photopolymerizable monomer mixture includes a mixture of photopolymerizable monomers, a photo-initiator, and a crosslinker.

6. The method of claim 5, wherein,
   the photopolymerizable monomers include one selected from poly-(ethylene glycol) methacrylate, poly-(ethylene glycol) diacrylate, polyethylene glycol) methyl ether acrylate, ethylene glycol methacrylate, ethylene glycol methyl ether acrylate, and acrylamide,
   the crosslinker includes one selected from poly-(ethylene glycol) dimethacrylate, N,N'-Methylenebisacrylamide, ethylene glycol dimethacrylate, and divinylbenzene, and the photo-initiator includes one selected from diethoxy acetophenone and 2,2-dimethoxy-2-phenylacetophenone.

7. The method of claim 1, further comprising:
infiltrating an etchant into the photonic crystal to remove the plurality of colloidal particles, after irradiating the ultraviolet light.

8. The method of claim 1, further comprising:
injecting additional particles into the photonic crystal to adjust the photonic bandgap of the photonic crystal, after irradiating the ultraviolet light.

9. The method of claim 8, wherein the additional particles include quantum dots absorbing light of a specific wavelength band to generate light of a different wavelength band.

10. The method of claim 1, further comprising:
compressing or swelling the photonic crystal to adjust a photonic bandgap of the photonic crystal, after irradiating the ultraviolet light.

11. The method of claim 1, wherein the plurality of colloidal particles are spaced apart from each other by a first distance prior to applying the electric field to the photopolymerizable monomer-crystal mixture; and
the plurality of colloidal particles are spaced apart from each other by a second distance after applying the electric field to the photopolymerizable monomer-crystal mixture, the second distance being less than the first distance.

12. A method of fabricating a color filter, the method comprising:
providing at least two sheets of substrates facing each other and at least two photopolymerizable monomer-crystal mixtures filling an area between the at least two sheets of substrates, wherein the at least two photopolymerizable monomer-crystal mixtures each include a photonic crystal solution, a photopolymerizable monomer mixture and a plurality of colloidal particles dispersed in the photopolymerizable monomer-crystal mixture, the plurality of colloidal particles being electrically charged;
controlling intervals between the plurality of colloidal particles to different intervals by gradually varying intensities of electric fields applied in a vertical direction between a top surface and a bottom surface of each of the at least two photopolymerizable monomer-crystal mixtures such that a respective one of the intervals in the vertical direction between the plurality of colloidal particles gradually vary according to a height of the photonic crystal solution associated therewith; and
irradiating ultraviolet light to the at least two photopolymerizable monomer-crystal mixtures to photopolymerize the photopolymerizable monomer mixture so as to form the color filter.

13. The method of claim 12, wherein the plurality of colloidal particles are formed from a polar material exhibiting polarity at a surface thereof independent of an external stimulus.

14. The method of claim 13, wherein the plurality of colloidal particles include one selected from polystyrene, silica, PMMA, PBMA, and a copolymer thereof.

15. The method of claim 12, wherein the photonic crystal solution in each of the at least two photopolymerizable monomer-crystal mixtures have the same composition.

16. The method of claim 15, wherein the photonic crystal solution is configured to reflect light of a red wavelength band when a voltage is not applied.

17. The method of claim 12, wherein the photopolymerizable monomer mixture includes a mixture of photopolymerizable monomers, a photo-initiator, and a crosslinker.

18. The method of claim 17, wherein,
the photopolymerizable monomers include one selected from poly-(ethylene glycol) methacrylate, poly-(ethylene glycol) diacrylate, poly(ethylene glycol) methyl ether acrylate, ethylene glycol methacrylate, ethylene glycol methyl ether acrylate, and acrylamide,
the crosslinker includes one selected from poly-(ethylene glycol) dimethacrylate, N,N'-Methylenebisacrylamide, ethylene glycol dimethacrylate, and divinylbenzene, and
the photo-initiator includes one selected from diethoxy acetophenone and 2,2-dimethoxy-2-phenylacetophenone.

19. The method of claim 12, wherein at least one of the at least two sheets of substrates is transparent to red wavelength band light, green wavelength band light, blue wavelength band light, and UV light.

* * * * *